United States Patent [19]
Brun

[11] 3,920,281
[45] Nov. 18, 1975

[54] SERVO-STABILIZING ARRANGEMENT FOR THE SPEEDS OF VEHICLE WHEELS WITH DELIBERATE BRAKING

[76] Inventor: Marcel Brun, 7 Boulevard Karl Marx, 42100 Saint-Etienne-Loire, France

[22] Filed: May 24, 1974

[21] Appl. No.: 473,321

[30] Foreign Application Priority Data
May 28, 1973 France .............................. 73.19941

[52] U.S. Cl. ................................ 303/21 R; 303/10
[51] Int. Cl.² .......................................... B60T 8/24
[58] Field of Search ............ 188/177, 181 R, 181 A, 188/181 C, 181 T; 303/21 R, 21 F, 10

[56] References Cited
UNITED STATES PATENTS
3,566,987  3/1971  Franzel .......................... 188/177 X

*Primary Examiner*—Duane A. Reger
*Attorney, Agent, or Firm*—Waters, Schwartz & Nissen

[57] ABSTRACT

An apparatus for servo-stabilizing the speeds of two wheels of a vehicle during braking thereof comprising pumps coupled to each of two wheels to be braked for producing output related to the speed of the associated wheel and a receiver member coupled to the pumps and including a pivotal blade element subject to the discharge pressures of the pumps and operative in relation to any difference between the output pressures. A distributor in the form of a three-way valve is connected to the pivotal blade to control the braking force exerted on each wheel. At the time of braking of a vehicle in a straight line, the braking forces exerted on each wheel are equalized whereas when the vehicle is braked on a curve, cams mounted on the steering shaft act on valves which provide differential effect on the pivotal blade corresponding to the different speeds of the wheels. A vehicle speed sensing device is actuated by ambient air and a brake force sensing device is coupled therewith and to the pivotal blade member for decreasing the braking action when the speed of the vehicle is above a predetermined value and the braking force exceeds a predetermined value.

11 Claims, 11 Drawing Figures

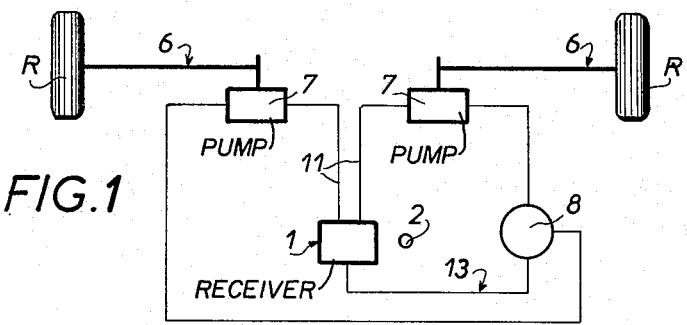
FIG.1
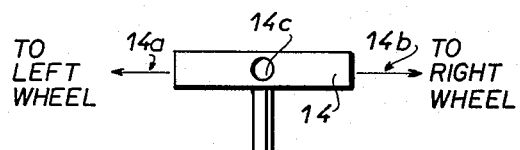
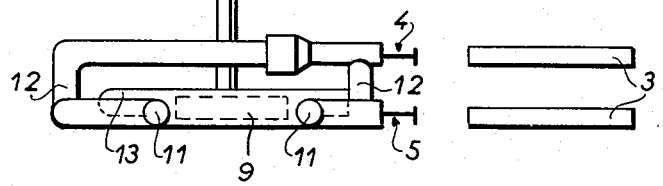
FIG.2
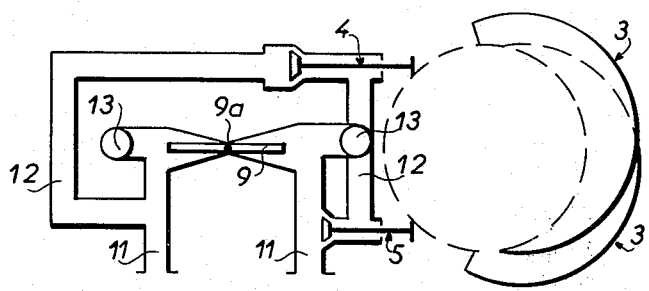
FIG.3

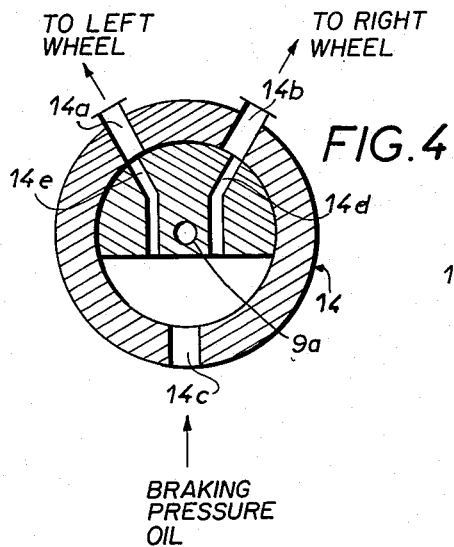
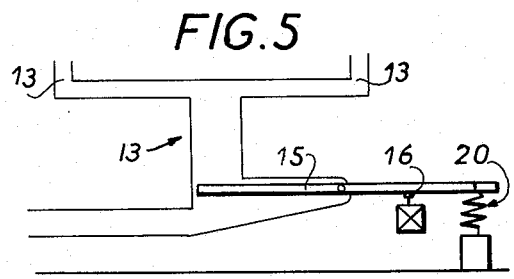
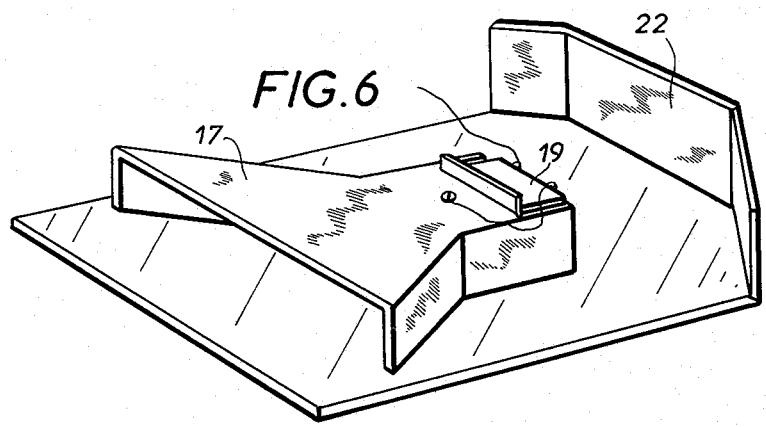
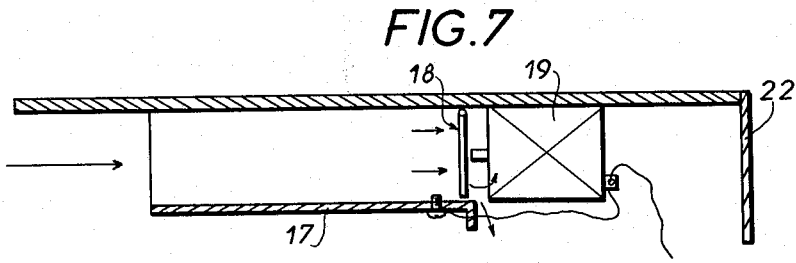

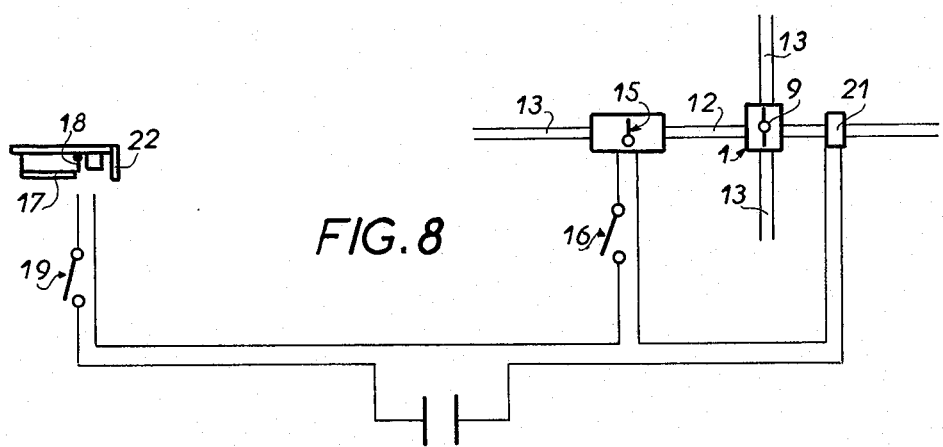

SERVO-STABILIZING ARRANGEMENT FOR THE SPEEDS OF VEHICLE WHEELS WITH DELIBERATE BRAKING

The invention relates to a servo-stabilizing arrangement for equalizing the speed of vehicle wheels at the time of braking.

The invention is concerned with the technical field of improving the grip of the wheels and also the braking of vehicles.

According to the invention, it is desired to provide an arrangement which assures the stabilizing or balancing of the speeds of the right and left wheels at the front and/or at the rear when a vehicle is deliberately braked in a straight line, or the differentiations in the speeds between the right and left wheels according to the orientation of the wheels when braking on a curve.

The arrangement according to the invention is characterized in that it comprises a wheel speed recording device connected to at least one receiver member acting on the supply of the braking force of at least one wheel with a view to balancing the speeds when braking in a straight line; the receiver member is mechanically and hydraulically connected to the member controlling orientation of the wheels with a view to the differentiation in the speeds of wheels when braking on a curve; a device operated by the outside air can be connected to the receiver member with a view to carrying out successive braking operations and a decrease or interruption in the braking up to a certain speed, at which the ambient air device no longer acts.

These characteristics and others will be apparent from the following description.

In order to establish the objective of the invention without however limiting it, reference is made to the accompanying drawings, in which:

FIG. 1 is a diagram showing the principle of the arrangement according to the invention.

FIG. 2 is a diagrammatic view showing the recorder device and its connecting member with the wheels, and also the connection with the member for controlling the orientation of the wheels.

FIG. 3 is a view in plan and in section according to FIG. 2.

FIG. 4 is a sectional view of the member for the connection with the wheels, according to FIG. 2.

FIG. 5 is a diagrammatic view of the connecting member between the recorder device and the oil reservoir.

FIG. 6 is a perspective view of the ambient air device.

FIG. 7 is a sectional view according to FIG. 6.

FIG. 8 is a diagrammatic view illustrating the arrangement adapted to complete non-locking of the wheels.

FIG. 9 is a diagrammatic view showing the arrangement adapted to the simplified braking of only two wheels.

FIG. 10 is a diagrammatic view illustrating the arrangement adapted for the simplified braking of four wheels.

Figure 11:
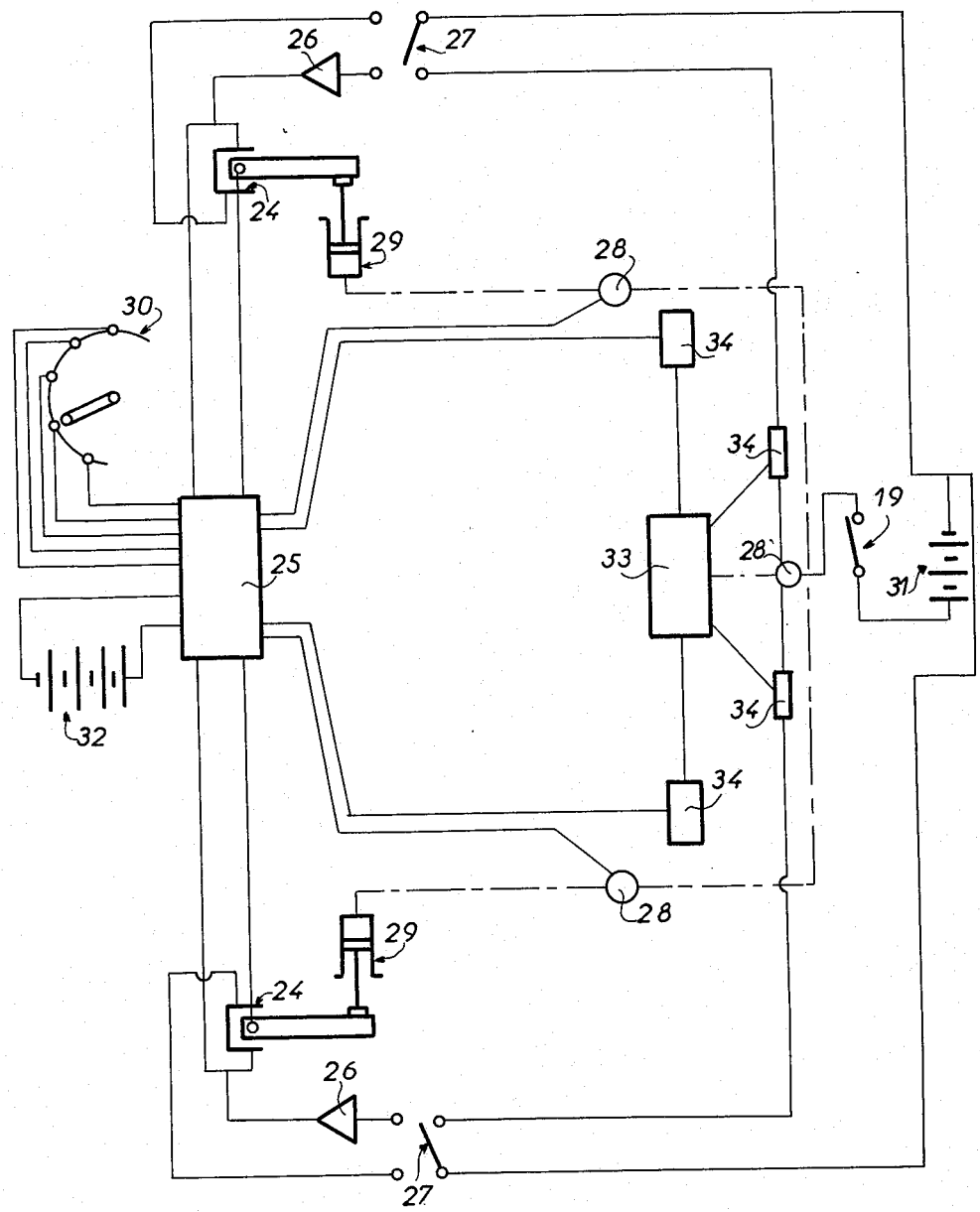
FIG. 11 is a diagrammatic view of the arrangement in an electronic version.

In order more specifically to set out the objective of the invention, the non-limitative constructional forms which are illustrated in the Figures of the drawings will now be described.

The devices or members which come within the scope of the invention can be based on any type of operation, such as hydraulic, electronic, electromechanical, fluid, pneumatic.

In the description concerned with FIGS. 1 to 10 of the drawings, a hydraulic system and ambient air have been chosen, but not by way of limitation.

The arrangement comprises essentially a receiver member or brain 1 (FIG. 1), which is preferably fixed on one side of the steering column 2 of the guiding or steering wheels R so that cams 3 (FIGS. 2 and 3) are able to act on valves 4 and 5 connected to the brain, when the operator moves the steering wheel or the steering handle for the wheels.

Mounted on the shaft 6 of each of the guiding wheels R (FIG. 1) is a pump 7 connected to an oil reservoir 8 and to the brain. The brain itself is connected to the reservoir 8, for the return of oil.

The brain 1 is formed by a block receiving a movable vane or plate 9, designed so that it can oscillate with shaft 9a, under the thrusts from the flow of the oil originating from each of the pumps of the wheels.

The valves 4 and 5 co-operate with the cams 3 which open or close the circuits communicating with the oil supply pipes 11 of the pumps 7 of the wheels and with the inlets 12 and outlets 13 in the block carrying the blade.

Mounted on the shaft 9a of the blade 9 is a member distributing oil to the right-hand wheel or to the left-hand wheel, and as an example, this member can be a three-way value 14 which is illustrated in FIGS. 2 and 4, where it is possible to see the connections 14a–14b with the wheels and the inlet connection 14c for the braking pressure.

Mounted between the brain and the oil reservoir 8 is a block receiving a movable vane or plate 15 operated by the oil coming from the brain and closing by a pivotal action with resilient return an electric contact 16, when the pressure becomes low, before the oil returns to the reservoir.

The ambient air device can be formed in several ways, for example as an air-speed indicator, a difference in mercury level or other arrangement combined with the block and closing an electric contact.

In a more economical manner, there is provided here a pipe 17 forming a funnel, which is fixed beneath the vehicle at a position which is conveniently reached by the outside air. At the end of this tube, a movable flap 18 (FIG. 7) can pivot under the force of the air so as to close an electric contact 19, to permit in combination with the brain a very reduced or even a cut-off braking action.

Before describing other arrangements as modifications, the manner in which the arrangement according to the invention functions will now be explained.

While the operator is not braking, nothing happens, although the blade 9 can oscillate.

As soon as the operator brakes, he obtains equality in speed of the wheels in a straight line, even if the brakes are badly adjusted, if the state of gripping of the wheels is different or if the state of gripping of the immobile part on which the braking is operative, generally the ground, is different.

Actually, the oil of each pump 7 actuated by each wheel sends by way of a piping their different thrusts in a direct ratio with their different speeds to each face of the movable plate 9, whose 9a shaft acts on the three-way valve 14, throttling to a greater or lesser extent or closing the oil inlet to the piston of the brake actuator which is braking the wheel going too slow. The other piston maintains its opening and its power, as shown in FIG. 4, to the passages 14d,14e of the three-way valve, which have a diameter smaller than that of the outlet 14a,14b, until equality of their speeds is obtained. Thus, by oscillations of the vane or blade 9, this equality is maintained until the braking action of the operator ends.

In the case of a voluntary cornering and at the same time an equally voluntary braking, the valves 4 and 5 of the brain, which are operated by the cams 3 of the steering wheel, set up variation in the inputs of oil from the pumps 7, decreasing on one side or the other the normal oscillation of the blade 9 and then causing predetermined differences in the wheel speeds, which are variable according to the degree of steering of the wheels, instead of the aforesaid equality.

The obtaining of equality in the speeds of the wheels in a straight line or the decrease in the speed of the outside wheel when cornering improve the maintenance of the chosen path of the vehicle during its braking.

Furthermore, none of the wheels can be in a position close to locking, or is locked, because immediately the blade 9 decreases the braking pressure because of the speed of the other in a straight line.

This can happen in cornering, but only when the wheel has reached the predetermined difference in speeds, and this is low.

In this case, and also when the general gripping is very reduced, i.e. friction of the ground is low, the wheels can be pre-locked and it is then that the ambient air device becomes operative.

The reduction in or cutting off of the arrival of braking oil can be obtained by an electromagnetic valve 21 arranged on the initial pipe for the braking oil (FIG. 8).

When the two wheels lose their grip during the braking, they start to be pre-locked, that is to say, they have speeds much lower than those with which they should have in relation to the speed of the vehicle.

In this case, the two pumps 7 no longer send sufficient oil into the brain, the outlet pressure of this latter on the blade 15 becomes small and the contact 16 is closed (FIG. 5) because of the spring 20.

If the contact 19 of the ambient air device is also closed, because of the high speed of the vehicle, the electric circuit is established, the electromagnetic valve 21 functions and the braking is very much reduced or ceases.

The wheels being less braked, or not at all, then increase their speeds. The pumps 7 deliver higher pressures. The delivery of oil recommences with a force sufficient to cancel out the force of the spring 20. The contact 16 is opened, the electric circuit is broken and the electromagnetic valve 21 once again allows braking oil to pass and this again becomes operative. There is then obtained a rapid succession of braking operations and a decrease or interruption in the braking (unbraking) until the vehicle is brought to the chosen speed, at which the contact 19 of the air pipe is opened.

As an example, taking an automobile vehicle traveling at 60 Km per hour.

This procedure starts before the wheels are locked, that is to say, before their speeds become zero, at which their gripping would be zero on the fixed part on which they are in contact, thereby causing an uncontrolled skid.

On the contrary, it permits re-assuming a certain gripping action and a certain braking effect, so as to aid the maintenance of the chosen path, all the more so as the blade 9 continues its intervention.

Below this chosen speed and because of the opening of the contact 19, the anti-locking device no longer functions and the vehicle can be braked under the usual conditions and always with balancing of the speeds of the wheels in a straight line or with predetermined different speeds in a curve.

In general, because of the much lower speed, the maintenance of the chosen path of the vehicle then becomes easy, as is also the braking, which then permits the total locking of the wheels and the final stopping of the vehicle.

The air pipe has the advantage of being less expensive by comparison with an air-flow instrument or other systems, but it is less accurate.

However, when it is desired to use it for a vehicle travelling on a flat surface, this pipe will be chosen to be of small height and will be placed beneath the vehicle or inside the latter.

It will be necessary for the air inlet, which will lead to the pipe, to be placed in the lower part of the vehicle and moreover preferably close to a hot part, for example, in the case of a vehicle having a gasoline engine, either close to the engine itself, or close to the exhaust pipe, so as to eliminate the dangers of non-operation due to water, snow, ice.

In this position underneath the vehicle, the displacement of air which passes into its largest part on the top of the vehicle is much less sensitive to the winds which necessarily have an influence on the functioning of the valve of the air pipe.

This influence on the relative steadiness of the chosen speed at which the contact 19 is closed can be reduced by an adequate position of the opening of the pipe or of the air intake beneath the vehicle and protective shields 22 against wind coming from the rear and the side.

This influence then becomes acceptable for the good operation.

For the perfection in the use thereof, it will be necessary for a vehicle with more than two wheels to have one brain per group of two wheels, but only using a single air pipe giving the true speed of the vehicle and these supplementary brains should be close to the steering wheel or the handle controlling the guiding wheels so as to bring each new group of two wheels under the influence of the direction of the guiding wheels.

It will also be understood that as the voluntary braking is designed for acting on all the wheels by a single manipulation, it is possible that a single brain gives satisfactory results for the entire vehicle by servo-control of the orders of the two guiding wheels to the others.

Even if it is not considered to be useful to be able to preestablish the unequal speeds of the guiding wheels when cornering, the cams 3 and valves 4 and 5 can be omitted, the assembly then functioning only with the pumps 7, the brain and the ambient air device.

It may also not be thought to be useful to obtain equal speeds or predetermined different speeds of the wheels and only to retain the possibility of non-locking.

In this simplified system, there is then only kept the pump for each wheel and the ambient air device.

Each of the pumps then has at the outlet for the oil a valve which closes the first electric contact 16 when the pressure becomes small because of the reduction in speed of the wheel.

The ambient air device then acts as previously described. For this purpose, an electromagnetic valve 23 is fitted on each wheel, on the oil inlet for each wheel. These arrangements have been shown in FIG. 9 for operation on two wheels and in FIG. 10 for operation on four wheels.

In this case, it may be suitable to replace the hydraulic system by an electronic system, then obviating the pumps 7.

Fitted on each wheel is a proximity electronic detector 24 or an interrupter (FIG. 11) connected to a suitable small computer 25 and, by means of an amplifier 26 and a relay 34, to a contact 27 which is closed when the speed of the wheel reaches a low threshold, replacing the drop in oil flow leaving the brain in the previous embodiments.

The computer is designed to shut off, by means of electromagnetic valves 28, the oil pressure on the brake 29 of the wheel which is running too slowly in relation to the other. This electromagnetic valve replaces the movable blade of the hydraulic arrangement.

A system of terminals 30 co-operating with the steering shaft of the wheels sends orders to the computer when the control handle or steering wheel is operated, which causes the electromagnetic valves 28 to function with predetermined differences.

The electric contact 19 is closed above a predetermined speed and is connected to a battery 31. The computer is also connected to a battery 32, and a junction box 33, for controlling the braking oil and supplying voltage to allows the operation of the electromagnetic valves of each wheel only with voluntary braking.

In the case of a vehicle having a single wheel or if it is only desired to act on this wheel, of if in the case of a vehicle with several wheels and assuming that, with the object of simplification, the sensitization of the pre-locking of one wheel immediately permits the pre-locking of the other wheels, it may be sufficient to connect the speed of the wheel to the actual speed detector of the vehicle, that is to say, the ambient air device.

The advantages will be apparent from the description.

The invention is not limited in any way to that of its embodiments or to those of the embodiments of its various parts which have been more particularly indicated; on the contrary, it cover all variants.

I claim:

1. Apparatus for servo-stabilizing the speeds of two wheels of a vehicle during braking thereof, said apparatus comprising speed responsive means coupled to each of two wheels to be braked for producing an output signal related to the speed of the associated wheel, a receiver member coupled to said speed responsive means and including a control element which is operative in relation to any difference between the output signals of the speed responsive means, distributor means for controlling the braking force exerted on each wheel, said control element being coupled with said distributor means to control the same to establish the braking forces exerted on each wheel to equalize the speeds of the wheels at the time of braking in a straight line, means responsive to the degree of steering of the wheels and acting on said control element to counteract inequality of the output signals of the speed responsive means and provide differentiation in the speeds of the wheels when braking on a curve, vehicle speed sensing means actuated by ambient air, and brake force sensing means, said vehicle speed sensing means and said brake force sensing means being connected to said distributor means for decreasing braking action when the speed of the vehicle is above a pre-determined value and the braking force exceeds a pre-determined value.

2. Apparatus as claimed in claim 1 wherein said control element is a pivotal vane, said speed responsive means comprising a pump connected to each wheel and producing an output pressure, the pressures from the pumps of the two wheels being applied in opposition to one another on said vane.

3. Apparatus as claimed in claim 2 wherein the vehicle has a steering shaft for turning the wheels, said means which is responsive to the degree of steering of the wheels comprising two cams mounted on the steering shaft, and valves acted on by said cams and controlling fluid flow from the pumps to said vane to provide differential effect for the fluid pressures acting thereon and thereby of the speed of the wheels for a given degree of steering of the steering shaft.

4. Apparatus as claimed in claim 3 comprising a reservoir connected to said pumps and to said receiver member, said brake force sensing means comprising a movable blade subjected to the fluid pressure between the receiver member and said reservoir and switch means operated by said movable blade when the fluid pressure is below a value corresponding to a braking pressure which exceeds said pre-determined value at which braking action is decreased.

5. Apparatus as claimed in claim 2 wherein said vehicle speed sensing device comprises an air inlet tube for admission of air thereinto as the vehicle is traveling, a flap valve at the end of said tube subjected to the air pressure in said tube, and switch means closable by said flap valve when the vehicle speed exceeds said predetermined value.

6. Apparatus as claimed in claim 5 comprising a reservoir connected to said pumps and to said receiver member, said brake force sensing means comprising a movable blade subjected to the fluid pressure between the receiver member and said reservoir and second switch means operated by said movable blade when the fluid pressure is below a value corresponding to a braking pressure which exceeds said pre-determined value at which braking action is decreased.

7. Apparatus as claimed in claim 6 comprising electro-magnetic valve means for controlling supply of pressure fluid to said distributor means, the first and second switch means being connected to said electromagnetic valve means to operate the same when both switch means are closed.

8. Apparatus as claimed in claim 7 wherein said electromagnetic valve means is connected to said switch means and coupled to said distributor means to provide periodic actions producing a rapid succession of wheel braking operations while the speed of the vehicle has not yet reached a value at which the action ceases, the vehicle being then braked under the control of said receiver member.

9. Apparatus as claimed in claim 1 wherein said receiver member comprises a computer connected to circuit-breakers on each wheel, themselves connected to electric contacts by said vehicle speed sensing means and said brake force sensing means; said contacts being closed when the speed of the associated wheel reaches a low threshold; and electro magnetic valve means for reducing the brake action of the wheel which is running too slowly in relation to the other.

10. Apparatus as claimed in claim 9 wherein the speed differentiation means comprises a system of terminals secured to steering means for the wheels and connected to the computer so that the electromagnetic valve means provides differentiation in the speeds of the wheels when braking on a curve.

11. Apparatus as claimed in claim 10 comprising a junction box for controlling braking and supplying electrical energy for the operation of the electromagnetic valve means of each wheel only with voluntary braking.

* * * * *